United States Patent [19]

Sekido et al.

[11] 4,388,385

[45] Jun. 14, 1983

[54] SOLID ELECTROLYTE PHOTOCELL

[75] Inventors: Satoshi Sekido, Yawata; Tadashi Sotomura, Kashiwara, both of Japan

[73] Assignee: Matsushita Electric Industrial Company, Limited, Osaka, Japan

[21] Appl. No.: 294,017

[22] Filed: Aug. 18, 1981

[30] Foreign Application Priority Data

Aug. 19, 1980 [JP] Japan .................... 55-114593
Feb. 20, 1981 [JP] Japan .................... 56-24435

[51] Int. Cl.³ .................................... H01M 6/36
[52] U.S. Cl. .................................... 429/111
[58] Field of Search ............................ 429/111

[56] References Cited

U.S. PATENT DOCUMENTS 3,879,228  4/1975  Theodorou et al. ............ 429/111
4,119,768 10/1978  Bayard ............................ 429/111
4,235,955 11/1980  Sammells et al. .............. 429/111

OTHER PUBLICATIONS

P. G. P. Ang, et al., "Photoeffects On Solid-State Photoelectrochemical Cells," Chapter 25 in Photoeffects At Semiconductor-Electrolyte Interfaces, A. J. Nozik, Editor, A. C. S. Symposium Series No. 146 (1981).

Primary Examiner—Aaron Weisstuch
Attorney, Agent, or Firm—Lowe, King, Price & Becker

[57] ABSTRACT

A photocell comprising a solid electrolyte film or layer and a pair of electrodes sandwiching therebetween the electrolyte film. The solid electrolyte is AgBr, AgI and silver halide-containing double salts and mixed salts. One of the electrodes is optically transparent and the other electrode is made of a material capable of forming a charge transfer complex with the halogen generated on photodissociation of the electrolyte.

17 Claims, 16 Drawing Figures

VALUE OF n IN
C5H5NC4H9In

VALUE OF n IN
C5H5NC6H13In

VALUE OF n IN
C5H5NC8H17In

VALUE OF n IN
POLY-2-VINYLPYRIDINE

SOLID ELECTROLYTE PHOTOCELL

BACKGROUND OF THE INVENTION

1. Field of the Invention

This invention relates to a photocell utilizing the cell reaction between Ag and a halogen produced by photodissociation of silver halides and particularly AgBr, AgI and the like and showing high conversion efficiency.

2. Description of the Prior Art

It has been long known that silver halides undergo photodissociation and this phenomenon has been utilized in the photographic art and photochromic glasses.

An attempt has been made to fabricate primary cells which include a layer of solid electrolyte of a silver salt such as $RbAg_4I_5$ or $Ag_3SI$, a positive electrode formed on one side of the solid electrolyte layer and made of a mixture of a halogen (mainly, iodine) and graphite or a charge transfer complex such as $PbI_3$, $NR_4I_3$ (in which R represents an alkyl group), and a negative electrode of Ag formed on the other side. However, the primary cells have not been reduced to practice yet since the materials themselves are expensive and output power per cost is small.

There has been made a further attempt to manufacture cells which have an AgI or AgBr electrolyte layer, a transparent electrode formed on one side of the electrolyte layer, and a graphite electrode formed on the other side, the halogen which has been photodissociated by light passing through the transparent electrode being absorbed by the graphite electrode. However, the cells of this type have disadvantages that the thickness of the electrolyte layer must be below 10 microns to attain a cost per unit power of as low as about 100 yen/W. However, when the electrolyte layer is controlled to have such a small thickness as mentioned above, the cell can only stand repeated use of at most several cycles and absorption of halogen in the graphite electrode is so slow and so small in amount that the quantum efficiency becomes poor.

In recent years, the price of petroleum has risen sharply and efficient use of solar energy as a substitute for petroleum has been extensively investigated. Because of its low energy density on the surface of the earth and its seasonal, timewise and weather related variations, some difficulties are involved in practical use of solar energy. At present, solar energy is merely utilized thermally in most cases. In addition, in satellites or beacons in remote places, solar cells are sometimes used in combination with secondary cells but have the drawback that the power generation cost is as high as 2,000 to 10,000 yen/W.

SUMMARY OF THE INVENTION

It is accordingly an object of the present invention to provide a photocell which can be charged by irradiation of light and can repeatedly be used and which is relatively inexpensive.

It is another object of the invention to provide a photocell which shows an improved quantum efficiency of photodissociation.

It is a further object of the invention to provide a photocell which includes a positive electrode made of a material capable of forming complexes with halogens generated on photodissociation of an electrolyte.

According to the present invention, there is provided a photocell which comprises a solid electrolyte film made of a member selected from the group consisting of a silver halide, represented by AgX, wherein X is Br or I, and salts containing the silver halide, an optically transparent first electrode formed on one surface of the solid electrolyte film, and a second electrode formed on the other surface of the electrolyte film and made of a material capable of forming a charge transfer complex with halogen, whereby light is irradiated on the electrolyte film through the first electrode to permit the silver halide in the electrolyte film to be photodissociated and a discharge reaction is undergone between the silver formed on the first electrode and the complex formed in the second electrode by absorption of the halogen formed by the photodissociation.

In the practice of the invention, the halogen formed by the photodissociation of the silver halide is taken up by the second electrode which is made of a material capable of forming a charge transfer complex with the halogen, so that the halogen can rapidly be absorbed in large amounts, resulting in an increasing quantum efficiency of the photodissociation.

A primary feature of the present invention relates in the power generation cost. The power generation cost of an ordinary solar cell is in the range of 2,000 to 10,000 yen per unit power but that of the photocell according to the invention is in the range of 50 to 200 yen. The conversion efficiency and maximum output are, respectively 10% and 10 mw/cm$^2$ and are similar to those of the known solar cells. According to the teachings of studies of photographic techniques and solid electrolytes, these characteristics may be improved by improvements in conductivity by use of mixed crystals of silver halides, sensitization with dyestuffs, or ionic substitution.

Another feature of the invention is that since the photocell itself has the nature of a secondary cell, though small in capacity, electrolytes are photodissociated in a depth of about 1000 Å and accumulated as an active material for the cell, with its capacity reaching about 20$\mu$ Ah per cm$^2$. Solar cells show no capability of accumulation.

The above and other objects, features and advantages of the present invention will become apparent from the following description, taken in connection with the accompanying drawings.

DETAILED DESCRIPTION AND PREFERRED EMBODIMENTS OF THE INVENTION

Figure 1:
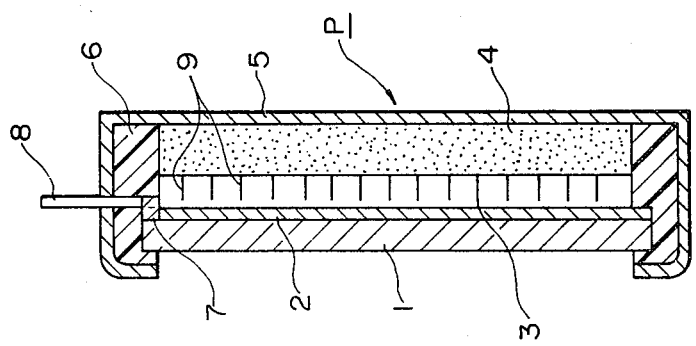
FIG. 1 is a schematic sectional view of a fundamental arrangement of a photocell according to the invention.

In FIG. 1, there is shown a fundamental arrangement of a photocell, generally indicated by P, according to the invention. The photocell P includes a transparent plate 1, such as of lead glass, serving as a support for the cell, an optically transparent first electrode 2 which does not take part in the cell reaction and which is formed on one side of the plate 1, an electrolyte layer 3 formed on the other side of the transparent electrode 2, and a second electrode 4. The cell P is encased in a casing 5 serving also as a current collector for the electrode 4. Indicated at 6 is a packing member which is favorably made of fluorinated olefin resins or copolymers of fluorinated olefins and olefins. The transparent electrode 2 has a terminal 7 for lead wire 8, which terminal is ordinarily made of Cr-Au vacuum deposited on the electrode.

The electrode 2 is usually made of an electronically conductive material such as Sn-doped $In_2O_3$ or In-doped $SnO_2$ and is vacuum deposited thereon with a small amount of Pt, by which it becomes stable over a long time and low in resistance. Alternatively, the electrode 2 may be formed by vacuum depositing a noble metal such as Au, Pt or Pd on a transparent glass plate.

In the practice of the invention, the electrolyte layer 3 is made of AgBr, AgI or silver halide-containing salts. The term "silver halide-containing salt or salt containing a silver halide" is intended to mean double salts such as $RbAg_4I_5$, $Ag_3SI$, $Ag_6I_4WO_4$, $Ag_7I_4PO_4$ and $Ag_{19}I_{15}$-$P_2O_7$ and mixed salts of silver salts and copper salts such as combinations of AgX and CuX wherein X is Br or I and those composed of $RbAg_4I_5$ and $RbCu_4I_{1.5}Cl_{3.5}$ and represented by the general formula, $RbAg_xCu_{4-x}I_yCl_{5-y}$ wherein x is a number ranging from 0.4 to 2 and y is a number ranging from 1.85 to 3.25. These mixed salts are so high in ionic conductivity and economical that the electrolyte layer or film can be made thick, leading to a prolonged lifetime when the cell is repeatedly used.

The electrolyte layer 3 may be formed by a vacuum deposition technique when its thickness is below 10 microns, or by a flame spray coating technique when the thickness is in the range of 10 to 100 microns, or by screen printing or doctor blade coating techniques when the thickness is over 100 microns.

The electrode 4 which is mainly composed of a material capable of taking up a halogen therein to form a charge transfer complex when the silver salts are photodissociated into silver and halogen. The materials capable of forming the charge transfer complex with halogen suitable for the purpose of the invention include nitrogen-containing compounds and more particularly pyridine derivatives such as poly-2-vinyl-pyridine, and poly-4-vinylpyridine and compounds obtained by quaternizing the pyridine derivatives with alkyl halides such as methyl to octyl iodide or bromide i.e. alkylpyridinium polyhalides or halides. Of these, ionic charge transfer complexes which are liquid at normal temperature are preferable. Examples of these liquid ionic charge transfer complexes include 1-ethylpyridinium iodide having 1 to 27 iodine atoms, propylpyridinium iodide having 1 to 27 iodine atoms, butyl- to octylpyridinium iodide having 1 to 27 iodine atoms, and poly-2-vinyl pyridinium polyiodide having 1 to 27 iodine atoms. Preferably, the number of iodine atoms in these iodides is in the range of from 4 to 8 and most preferably 5 as will be appreciated from phase diagrams appearing hereinafter, by which an eutectic composition can more readily obtained at lower temperatures. Further, the alkyl moiety of these alkylpyridinium iodides should preferably have 3 to 6 carbon atoms. As a matter of course, polybromides corresponding to the above-mentioned polyiodides are also usable. Choice of the halide depends on the type of halogen used in the electrolyte. It is preferable to use a halide of the same type as used in the electrolyte.

The liquid charge transfer complex is practically applied as the electrode by depositing on a suitable support serving as adsorbent. The support is, for example, press moldings, of artificial graphite or the like carbon material or silica gel or alumina gel. For instance, the poly-2-vinylpyridinium polyiodide complex shows a conductivity of about $10^{-4}$ $(ohm\cdot cm)^{-1}$ at room temperature, which is two orders of magnitude less than those of ionic, highly conductive silver salt conductors. In this case, the support is preferably made of carbon materials. On the other hand, butylpyridinium iodide obtained by quaternizing pyridine with butyl iodide shows a conductivity of $10^0$ to $10^{-2} (ohm\cdot cm)^{-1}$, in which case even when any of carbon, silica gel and alumina gel are used as the support, the discharge characteristic of the resulting photocell does not vary. In general, choice of the material for support should depend on the conductivity of complex used.

The current collector 5 which is in this case a part of the casing may be provided separately. The material for the collector 5 should be resistant to halogen and is preferably made of ferrite-base stainless steel having more than 30 wt% of Cr and more than 2 wt% of Mo from a viewpoint of cost and their resistance to the complex.

With the photocell of this type, it is preferable that the halogen photodissociated by incident light readily reaches the electrode 4 where it is absorbed by the complex. To this end, the electrolyte layer 3 is preferred to be provided with a plurality of slits 9 in the form of a lattice at the side of the electrode 4 as shown in FIG. 1. In this case, the electrolyte layer 3 should have a portion where no slits are formed in a thickness sufficient to prevent the incident light from passing therethrough from the side of the transparent electrode 2, say, in a thickness of, at least about 0.1 microns, by which the electrolyte near the slits is prevented from being photosensitized and undergoing short circuit by the action of incident light. By this, the quantum efficiency can be increased.

Figure 2:
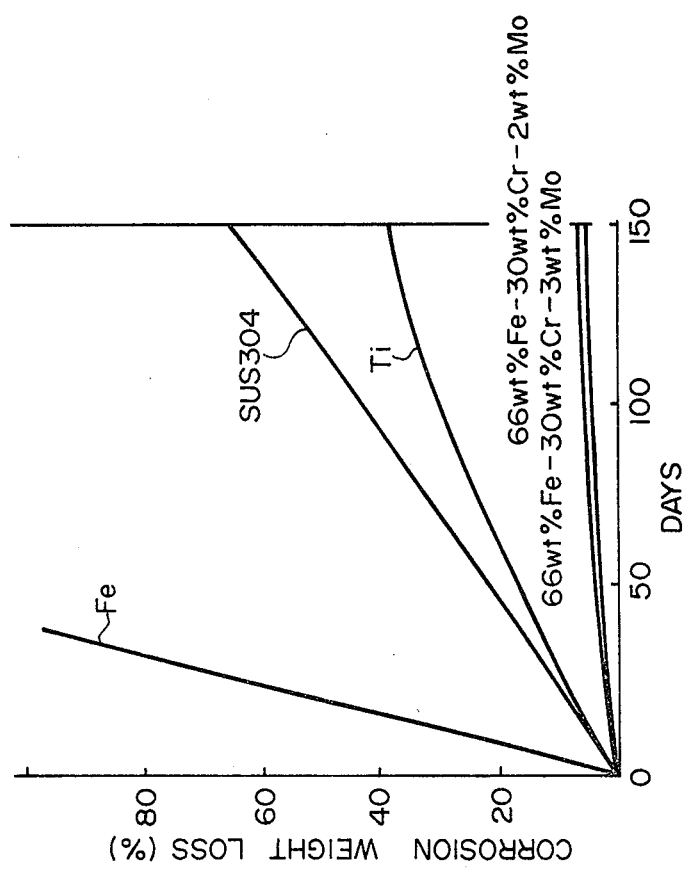
FIG. 2 is a graphical representation of weight loss of different types of metals immersed in iodine complex in relation to the number of days of immersion.

In FIG. 2, there is shown a corrosion loss of several metals which have been immersed in an iodine complex (1-ethylpyridinium polyiodide) having 15 iodine atoms at 60° C. for comparison purposes. The metals tested include Fe, stainless steel SUS 304, Ti and ferrite stainless steels of 66 wt% Fe-30 wt% Cr-2 wt% Mo and 66 wt% Fe-30 wt% Cr and 3 wt% Mo.

From the figure, it will be clearly seen that the ferrite stainless steels are suitable as the current collector for the electrode 4.

Similar tests were conducted on different types of synthetic resins using the same iodine complex and immersion conditions as mentioned above in order to determine variations in appearance and resistivity, with the results shown below.

TABLE

Corrosion Test of Synthetic Resins

| Test Specimen* | Resistivity (Ohm · cm)** | | | |
|---|---|---|---|---|
| | Before Test | After 10 days | After 30 days | After 100 days |
| polyester | $10^{14}$ | broken | disappeared | disappeared |
| polystyrene | $10^{16}$ | disappeared | disappeared | disappeared |
| polyvinyl chloride | $10^{15}$ | $10^{11}$ | $10^{10}$ | $10^{10}$ |
| polypropylene | $10^{15}$ | $10^{14}$ | $10^{14}$ | $10^{14}$ |
| polyimide | $10^{17}$ | $10^{16}$ | $10^{16}$ | $10^{16}$ |
| copolymer of ethylene and tetrafluoroethylene | $10^{17}$ | $10^{17}$ | $10^{17}$ | $10^{17}$ |

*Each test specimen was used in the form of a 0.1 to 0.2 mm thick film.
**Immersed in the charge transfer complex, 1-ethylpyridinium polyiodide (EIP$_{15}$) at 60° C.

As described hereinbefore, the electrolyte layer is preferably formed with a plurality of slits of a lattice form. This is experimentally confirmed as follows. A photocell of the arrangement of FIG. 1 was made to have the electrodes 2, 4 each having an area of 1 cm². The second electrode was made of a molding of carbon powder deposited with poly-2-vinylpyridinium hexaiodide complex. The electrolyte layer had a thickness of 100 microns and was made of an electrolyte of RbAg$_{0.4}$Cu$_{3.6}$I$_{1.85}$Cl$_{3.15}$. There were made two types of photocell including a photocell A (hereinafter referred to as standard cell) in which the electrolyte layer was provided with slits of a lattice form having equal distances of 3 mm, a width of 0.5 mm and a depth of about 99 microns on the surface which was in face-to-face relation with the electrode 4 and a photocell B having no slits in the electrolyte layer. These photocells were each irradiated at a distance of 50 cm from a 500 W Xe lamp for 1 minute from the side of the transparent electrode 2.

Figure 3:
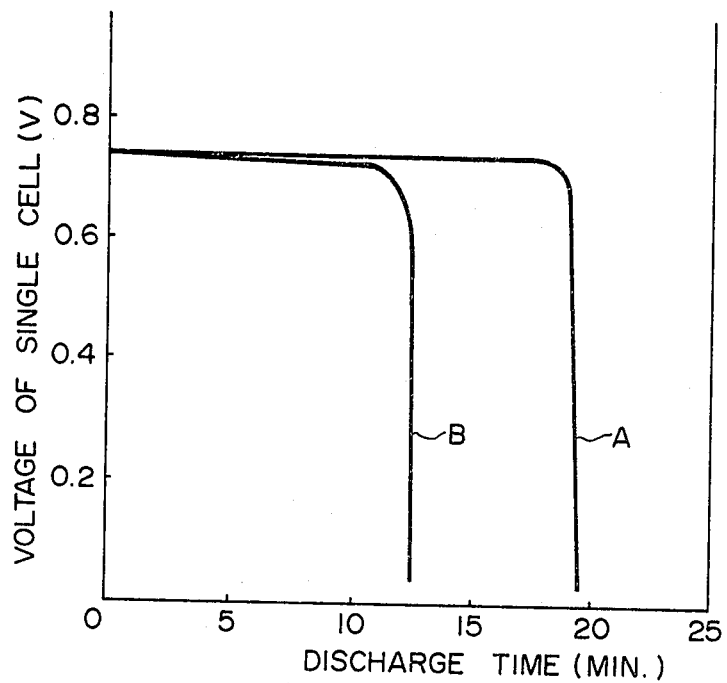
FIG. 3 is a graph showing the relation between cell voltage and discharge time for photocells having an electrolyte layer formed with slits therein and having no slits in the layer, respectively.
Figure 4A:
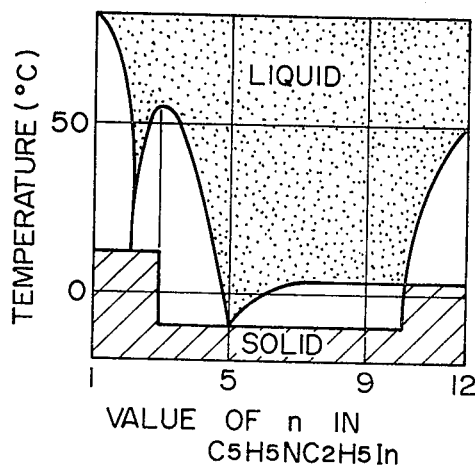
FIGS. 4(a) through 4(f) are, respectively, phase diagrams of different types of complexes used as the second electrode.
Figure 4B:
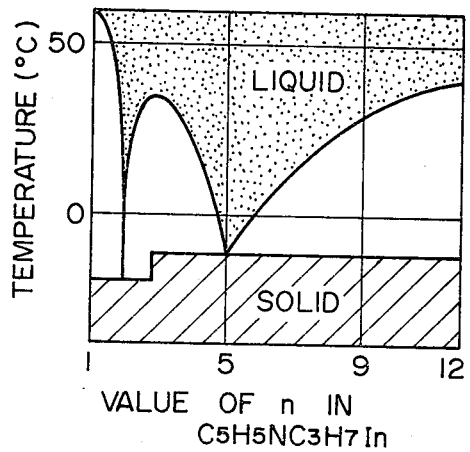
Figure 4C:
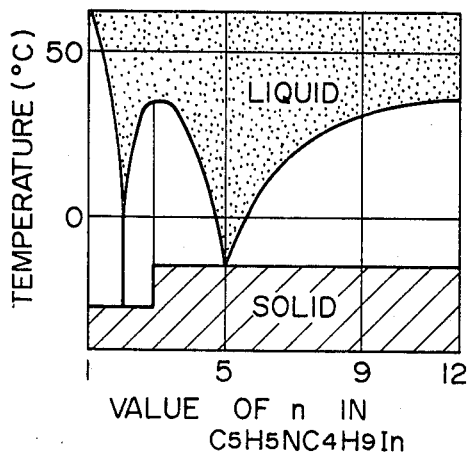
Figure 4D:
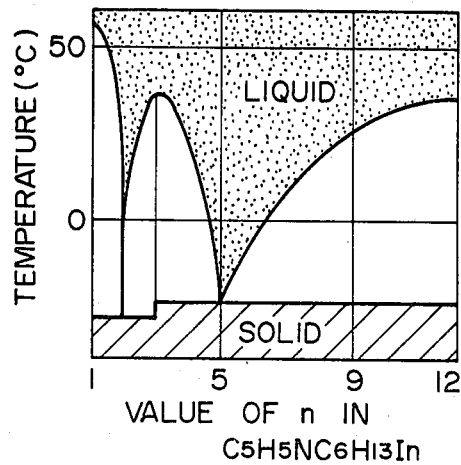
Figure 4E:
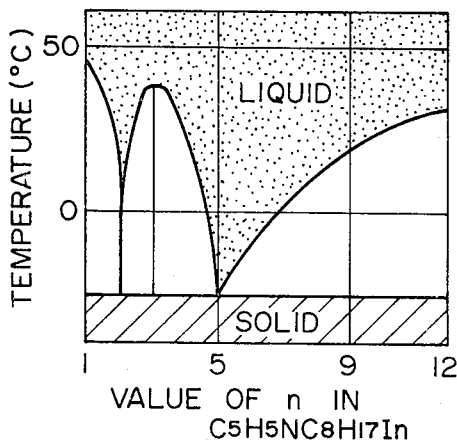
Figure 4F:
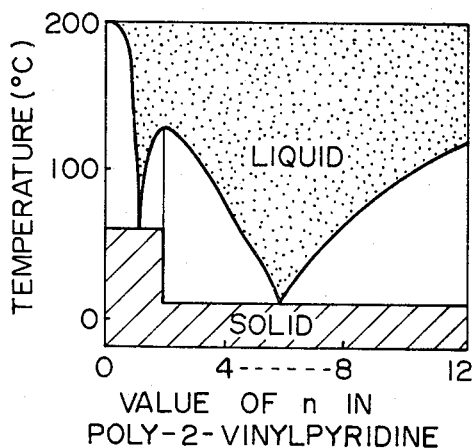

Their discharge curves obtained using an electric current of 100 μA are shown in FIG. 3.

From the figure, the photocell A having the slitted electrolyte layer is superior to the photocell B.

In FIGS. 4(a) through 4(f), there are shown phase diagrams of the complexes suitable for the purpose of the invention. These complexes become higher in conductivity in the liquid state than in the solid state. The conductivity of the solid complex is usually in the range of below $10^{-6}$ (ohm·cm). The liquid complexes have further advantages that they show good contact with the electrolyte layer thereby ensuring excellent discharge characteristics. Also since local distribution of halogen in the complex hardly occurs and the absorption speed of halogen is high, recombination of photodissociated substances hardly takes place, the quantum efficiency thus being improved. From these, the composition of the complex is preferred to be an eutectic composition. As will be seen from the phase diagrams, the eutectic compositions reside in those having about 5-6 carbon atoms and the eutectic temperature decreases with an increase in number of carbon atoms contained in the alkyl moiety.

Figure 5:
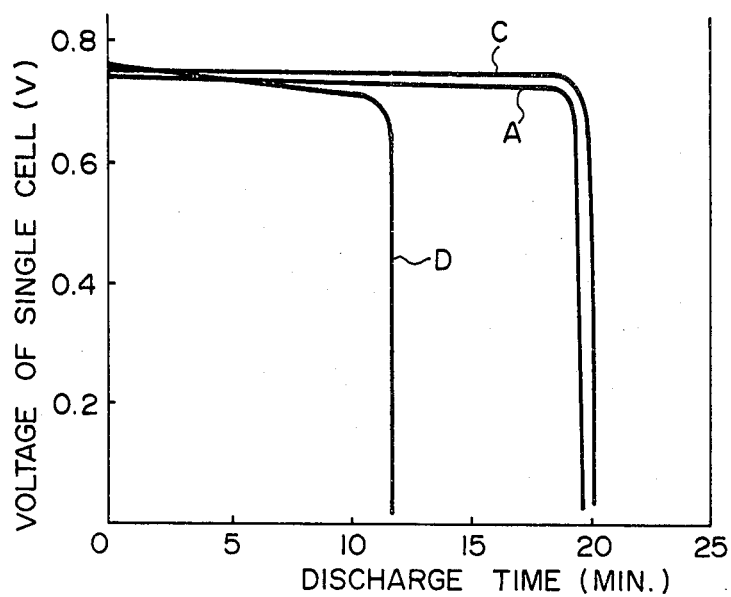
FIG. 5 is a graphical representation of a discharge characteristic of cells using complexes as the second electrode in comparison with that of a cell not using a complex.

FIG. 5 shows the effect of charge transfer complexes used as the second electrode. In the figure, A is the previously described standard cell, C is a photocell of the invention in which there is used as the second electrode a molding of a complex of eutectic composition of n-butylpyridinium iodide and iodine and 25 wt% of silica gel, and D is a known photocell in which a graphite molding is used as the second electrode. These photocell were irradiated and discharged under the same conditions as in the case of FIG. 3.

From the figure, it will be seen that the use of the complexes results in a considerable increase of capacity with an attendant increase of quantum efficiency.

Figure 6:
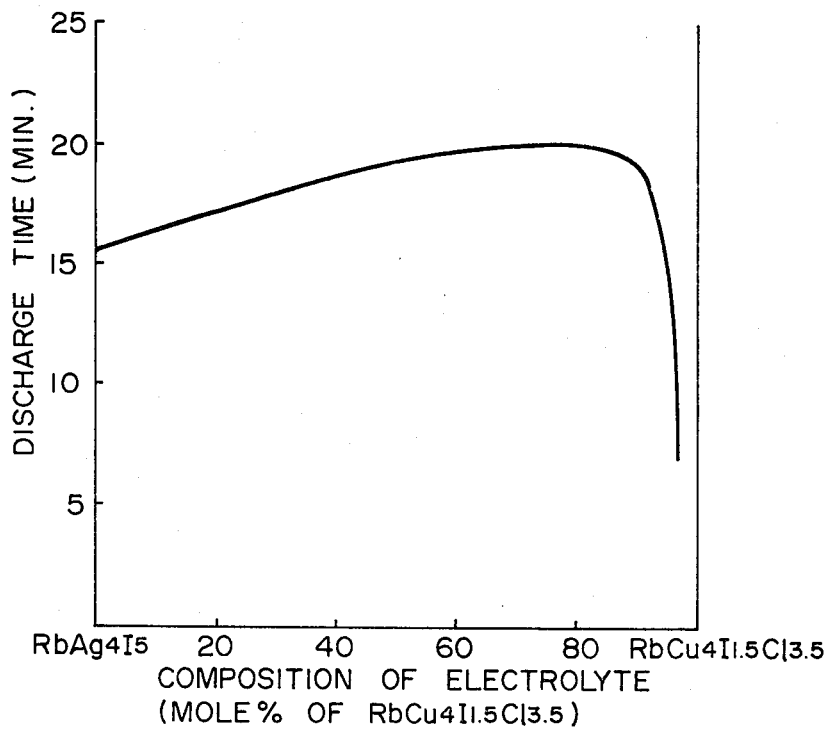
FIGS. 6 through 8 are graphs each showing the relation between the composition of electrolyte and discharge time.

Then, the effect of mixed salts of silver and copper in different mixing ratios was determined. For this purpose a standard cell was made except that the electrolyte layer was made of RbAg$_4$I$_5$ and RbCu$_4$I$_{1.5}$Cl$_{3.5}$ in different ratios. The discharge capacity of the cell is shown in FIG. 6 after irradiation under the same conditions as in FIG. 3. Even when the copper salt is present at up to 90 mole%, the capacity is greater than that of the cell using RbAg$_4$I$_5$ alone as the electrolyte.

Figure 7:
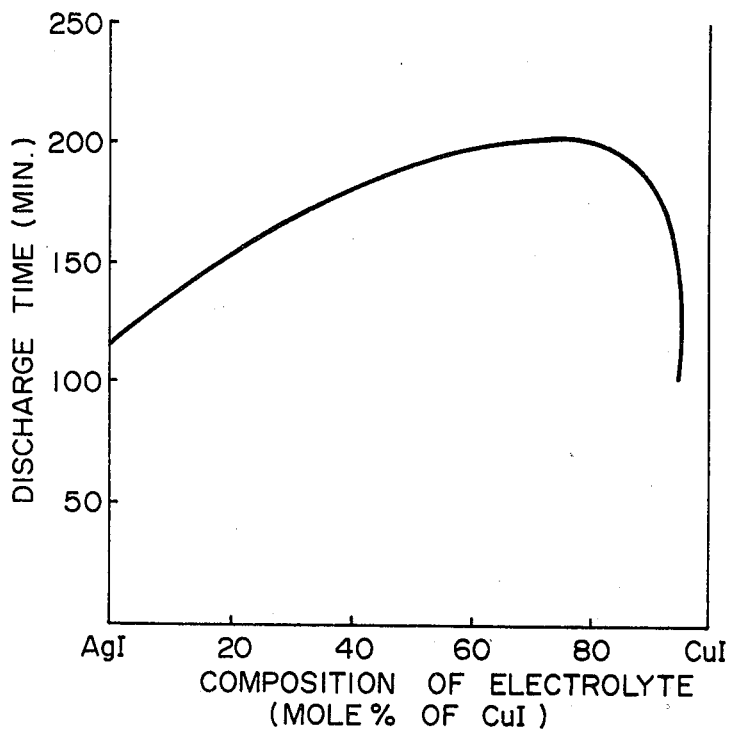
Figure 8:
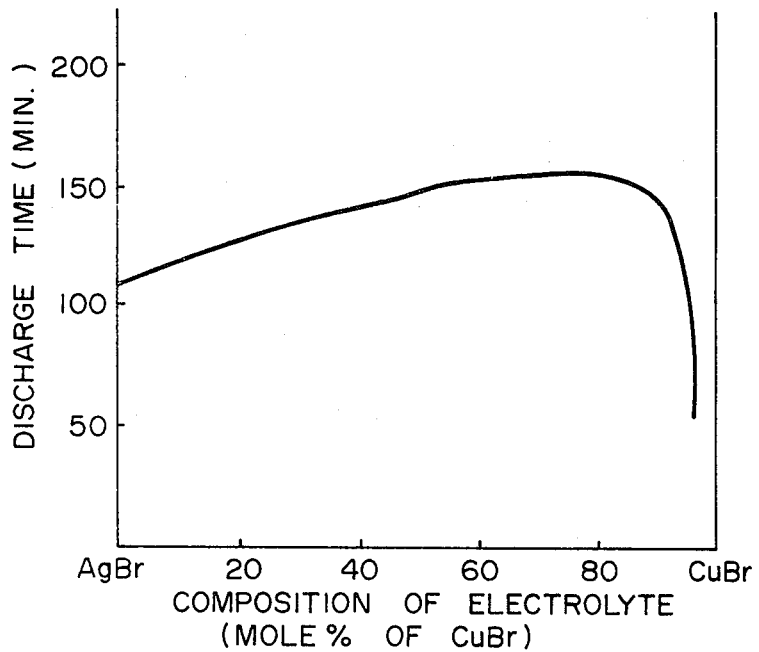

FIGS. 7 and 8 are similar to FIG. 6 but the electrolytes used were a mixture of AgI and CuI and a mixture of AgBr and CuBr in FIGS. 7 and 8, respectively, and the capacity was determined using a discharge current of 10 μA. The reason why the discharge current was changed is due to the fact that these electrolytes are low in ionic conductivity at room temperature.

From these results, it has been found that though a reason for this is not clear, the quantum efficiency of the photodissociation increases when the copper salts are added up to 90 mole% rather than when the silver salts are used singly. The addition of the copper salts contributes to a drastic reduction in cost of material.

Figure 9:
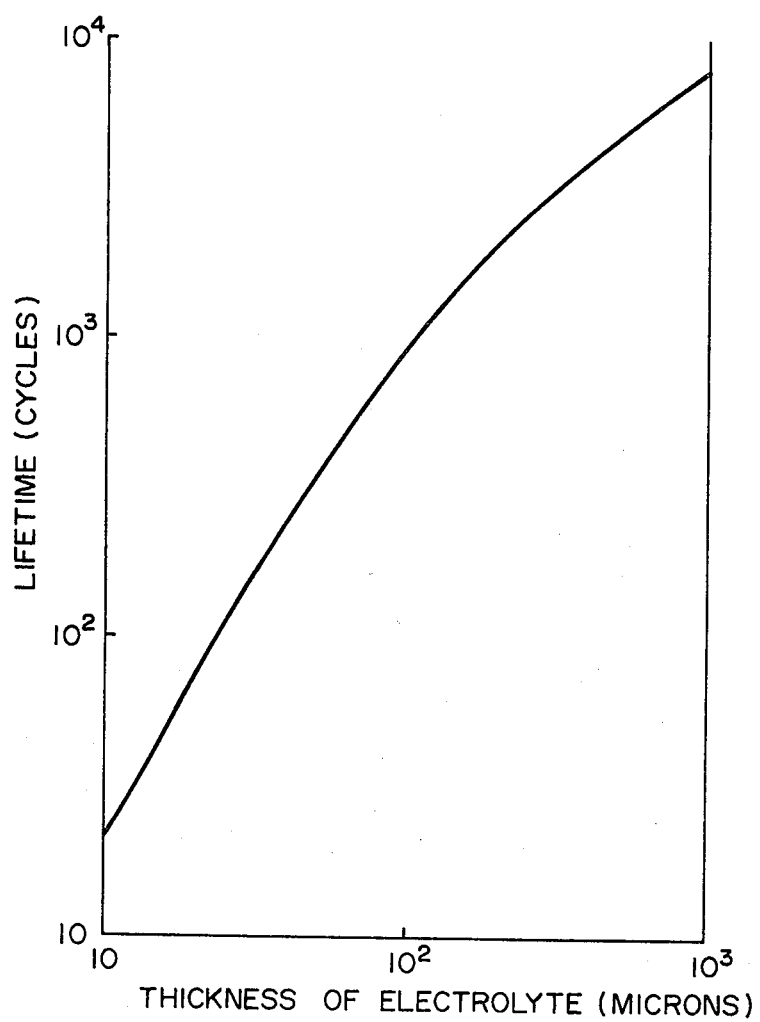
FIG. 9 is a graph showing the relation between the lifetime and thickness of electrolyte.

The variation of lifetime in repeated use is shown in FIG. 9 in relation to the thickness of the electrolyte layer of the standard cell. The irradiation and discharge conditions were same as those used in FIG. 3. In all cases, the lifetime is determined by short circuiting of the cell. When the thickness of the electrolyte layer is 10 microns, the lifetime is about 20 cycles and when the thickness is 100 microns, it is about 1000 cycles.

Figure 10:
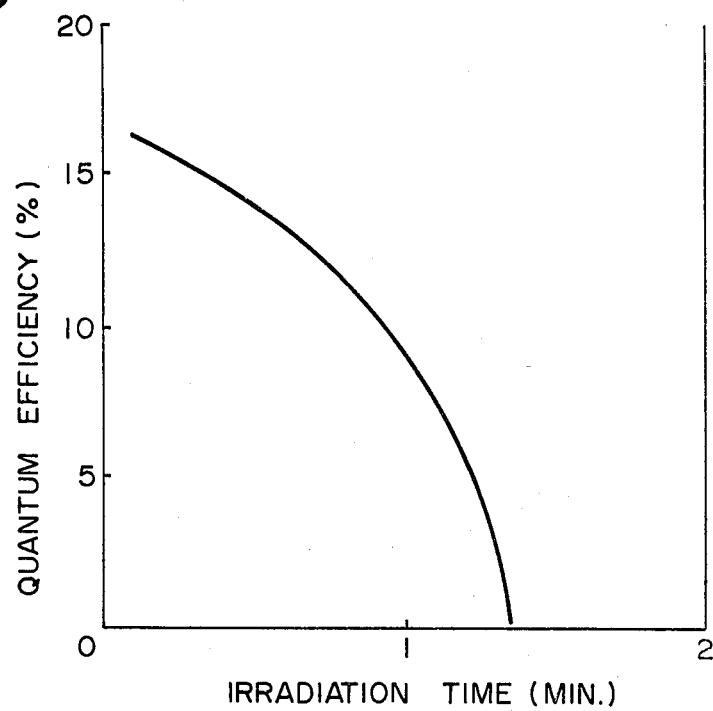
FIG. 10 is a graph showing the relation between the quantum efficiency and irradiation time.

The quantum efficiency of the standard cell obtained from the variation of capacity in relation to the irradiation time is as shown in FIG. 10, revealing that the efficiency reaches as high as 15% or more at the initial stage but decreases with an increase of the irradiation time, and finally drops to zero when the thickness of silver reaches about 1000 Å.

This is because light is absorbed by deposited silver and no photodissociation reaction takes place.

The photocell arranged as described hereinabove is operated as follows. When the cell is irradiated from the side of the transparent electrode 2, a silver halide is photodissociated into silver and halogen, the halogen being taken up in the electrode 4 through the electrolyte film. Then, electric power can be outputted from reaction at the transparent electrode 2 where the silver is accumulated as an active material for the negative electrode and at the electrode 4 where the halogen is accumulated as an active material for the positive electrode, and the electrolyte film of the silver halide or silver halide-containing salt can be regenerated by the discharge reaction. The electromotive force is about 1.0 V when using AgBr as the electrolyte and about 0.75 V when using AgI and the discharge current obtained is about 5 mA/cm².

As described hereinbefore, when silver is deposited on the side of the transparent electrode by photodissociation, light absorption takes place and thus the efficiency of the photochemical reaction gradually decreases.

Figure 11:
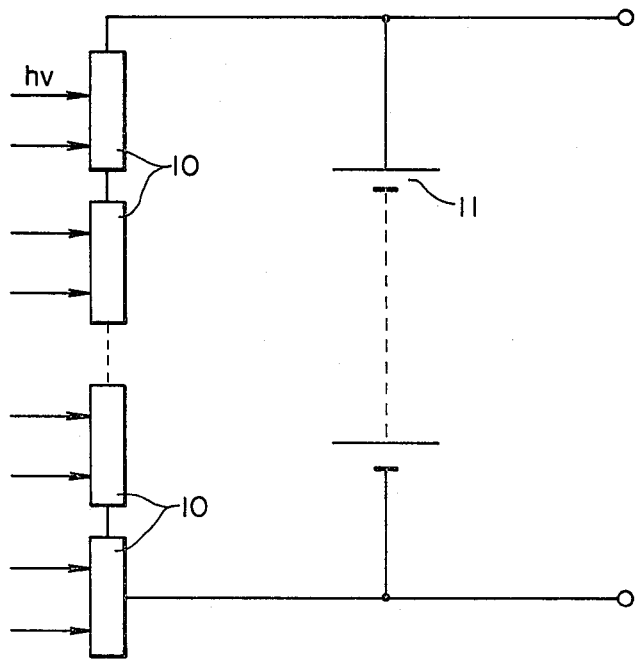
FIG. 11 is a circuit diagram of a photocell system according to the invention.

FIG. 11 shows a photocell system for preventing this lowering of the efficiency.

The photocell has the nature of a secondary cell though small in capacity. Accordingly, if it is not desired to attain a high conversion efficiency and a large energy density, it is, of course, not necessary to adopt such an arrangement as shown in FIG. 11.

The photocell system shown in the figure includes a plurality of the photocells which are connected in series and a secondary cell or electric double layer capacitor 11 for accumulation of energy which is connected in parallel to the photocell group. As mentioned hereinbefore, the photocell has an electromotive force of as small as about 1 V and a plurality of the photocells corresponding to a required voltage are connected in series.

The secondary cell usable in the invention includes an ordinary lead accumulator and a nickel-cadmium accumulator. The electric double layer capacitor is favorably used for this purpose because of its high accumulation energy density and reduced loss owing to the leakage current. Typical examples of the capacitor include one which has two active carbon electrodes and an organic electrolyte placed therebetween and has a breakdown voltage of 3 V per cell or one which includes an active carbon anode and a cathode made of either a mixture of $CuS_2$ and copper or $CuTiS_2$ and a $Cu^+$ ion conductive solid electrolyte placed between the electrodes and which has a breakdown voltage of about 0.6 V. It should be noted here that where a secondary cell is used as 11, its electromotive force must be below the level of the electromotive force of the photocells and where the capacitor is used, its withstand voltage must be higher than the electromotive force of the photocells. If the above requirement is not satisfied, there are produced problems that the secondary cell cannot be charged or the electric double layer capacitor is broken down.

What is claimed is:

1. A photocell comprising a solid electrolyte film made of a member selected from the group consisting of AgBr, AgI and salts containing a silver halide represented by AgX wherein X is Br or I, an optically transparent first electrode formed on one surface of the solid electrolyte film, and a second electrode formed on the other surface of said electrolyte film and made of a material capable of forming a charge transfer complex with the halogen of the electrolyte whereby, when light is irradiated on the electrolyte film through the first electrode, silver halide in said electrolyte film is photodissociated and an electrochemical discharge reaction is undergone between the silver formed on the first electrode and the complex formed in the second electrode by absorption of the halogen formed by the photodissociation.

2. A photocell according to claim 1, wherein said material capable of forming the charge transfer complex with the halogen is a pyridine derivative or a compound obtained by quaternizing the pyridine derivative with an alkyl halide.

3. A photocell according to claim 2, wherein said pyridine derivative is poly-2-vinylpyridine or poly-4-vinylpyridine.

4. A photocell according to claim 2, wherein said compound is an alkylpyridinium halide.

5. A photocell according to claim 4, wherein the alkyl moiety of said alkylpyridinium halide has 3 to 6 carbon atoms.

6. A photocell according to claim 4, wherein said alkylpyridinium halide is an alkylpyridinium iodide.

7. A photocell according to claim 4, wherein said alkylpyridinium halide is an alkylpyridinium bromide.

8. A photocell according to claim 4, wherein said alkylpyridinium halide has from 4 to 8 halogen atoms.

9. A photocell according to claim 2 or 4, wherein said compound is an ionic charge transfer complex which is liquid at normal temperature and is supported on an adsorbent selected from the group consisting of silica gel, alumina gel and carbon material.

10. A photocell according to claim 1, wherein said electrolyte film is made of AgBr.

11. A photocell according to claim 1, wherein said electrolyte film is made of AgI.

12. A photocell according to claim 1, wherein said electrolyte film is made of $RbAg_4I_5Ag_3SI$, $Ag_6I_4WO_4$, $Ag_7I_4PO_4$, or $Ag_{19}I_{15}P_2O_7$.

13. A photocell according to claim 1, wherein said electrolyte film is made of a mixed salt of AgX and CuX wherein X is Br or I.

14. A photocell according to claim 1, wherein said electrolyte film is made of a mixed salt represented by the formula $$RbAg_xCu_{4-x}I_yCl_{5-y}$$

in which X is a number value ranging from 0.4 to 2 and y is a number ranging from 1.85 to 3.25.

15. A photocell according to claim 1, wherein said electrolyte film is formed with slits of a lattice form while leaving a slit-free portion of a thickness sufficient to prevent passage of the incident light therethrough from the side of said transparent electrode whereby the passage of the halogen gas to said second electrode is facilitated.

16. A photocell according to claim 1, further comprising a current collector for said second electrode which is made of a ferrite-based stainless steel.

17. A photocell system comprising a plurality of the photocells of claim 1 connected in series and a secondary cell or electric double layer capacitor connected in parallel to said plurality of the photocells, the electromotive force of said secondary cell being lower than that of the photocells or the breakdown voltage of said capacitor being higher than the electromotive force of the photocells.

* * * * *